United States Patent [19]

Rinne, Jr.

[11] 4,425,873
[45] Jan. 17, 1984

[54] BIRD FEEDER

[76] Inventor: Risto A. Rinne, Jr., 9 Town View Dr., New Milford, Conn. 06776

[21] Appl. No.: 409,840

[22] Filed: Aug. 20, 1982

[51] Int. Cl.³ ............................................. A01K 39/00
[52] U.S. Cl. .............................. 119/51 R; 119/51 FS; 119/53
[58] Field of Search ................... 119/51 FS, 57, 52 R, 119/53, 59, 51 R, 63

[56] References Cited

U.S. PATENT DOCUMENTS

| | | | |
|---|---|---|---|
| 1,137,460 | 4/1915 | Carlson | 119/53 |
| 1,167,557 | 1/1916 | Hesser | 119/63 |
| 1,463,862 | 8/1923 | Wolf | 119/53 |
| 1,699,501 | 1/1929 | McCartney | 119/53 |
| 2,365,862 | 12/1944 | Bufton | 119/53 |
| 2,699,754 | 1/1955 | Smith | 119/52 R |
| 2,707,454 | 5/1955 | Wilkinson | 119/51 R |
| 2,941,506 | 6/1960 | Fulton | 119/53 |
| 2,944,516 | 7/1960 | Malloy, Sr. | 119/52 R |
| 4,034,715 | 7/1977 | Arner | 119/52 R |
| 4,167,917 | 9/1979 | Noll | 119/51 R |

Primary Examiner—Paul J. Hirsch
Attorney, Agent, or Firm—Mark Levy

[57] ABSTRACT

An improved bird feeder utilizing a sectional roof assembly with an elastomeric material joining a fixed roof section to a second movable roof section. The elastomeric material serves as both an environmental seal and as a hinge to allow easy access to the seed storage area. A flow rate block intermediate the base and a movable wall of the feeder allows bird seed to flow from the interior of the feeder at a rate dependent on the position of the flow rate block.

2 Claims, 3 Drawing Figures

BIRD FEEDER

BACKGROUND OF THE INVENTION

1. Field of the Invention

The present invention relates, in general, to a feed dispensing device and more particularly to a device for dispensing seed to wild birds. Such a device is more commonly referred to as a bird feeder.

2. Description of the Prior Art

Bird feeders are commonly loaded with a mixture of seeds used to attract birds for observation. The level of seed is monitored and the feeder is filled when either empty or sufficiently low. Depending upon the weather, the capacity of the feeder, the maximal flow rate of seeds the feeder will allow and the number of birds frequenting the feeder, the interval between required fillings can vary greatly. In general, birds will require more seed when weather conditions are severe.

Previous designs do not provide a method for increasing the flow rate of seeds during colder months nor do they provide a means for decreasing the flow rate during warmer months. The usual compromise made on existing designs is to allow unrestricted flow rates, permitting birds to consume as much seed as they desire. Consequently, rather than forage on the various food resources of summer, birds will tend to gourge themselves on seed from such a feeder. To save expense the owner of such a feeder will often refrain from feeding birds during the warmer months. This practice deprives the owner of enjoyment resulting from the observation of summer-time birds. This practice may also decrease the number and variety of birds that remain for winter observation because many birds will migrate to other areas when their normal food resources diminish and no stable food source is available to keep them in the area.

The ideal solution would provide restricted amounts of bird seed in the summer to attract birds to the feeder. This would discourage their migration while simultaneously making access to those seeds difficult enough to encourage the birds to exploit natural food supplies in the area. During the colder months such a feeder would provide unrestricted flow rates to prevent starvation of birds that are now dependent upon the feeder for their survival. A number of books, brochures, and articles describe the size, shape, and materials for the construction of bird feeders. Certain U.S. patents describe bird feeders of various configurations, including combination bird house and bird feeder designs. H. F. Johnson, in U.S. Pat. No. 3,316,883 teaches the advantages of a telescoping roof section with a large overhang. F. P. Noll, in U.S. Pat. No. 4,167,917 describes a combination bird house and feeder. In U.S. Pat. No. 3,945,344, R. L. Melrath discloses a throw away design that is manufactured of folded paper board. In U.S. Pat. No. 4,180,014, D. C. Mathews discloses an animal feeder made of a bendable stiff material such as sheet metal, bent only during the time of assembly and not continually thereafter. None of these patents or materials describes the invention hereinafter claimed or satisfies the objects hereinbelow mentioned. Other designs tend to be difficult, awkward, or time consuming to refill and often allow water seepage to contaminate the remaining seed supply.

Previous designs do not provide a means for disabling the flow of seeds from occurring at various sections of the feeder. Such would be desirable if after installation these sections of the feeder are not visible for observation from normal viewing locations.

From the foregoing discussion it is clear that an object of the present invention is to provide an improvement of a bird feeder.

Another object of the present invention is to provide elastomeric material to create a water repellent seam while providing the capability to maintain those planes of motion associated with a hinge mechanism.

A further object of the present invention is to provide a means of varying the restriction imposed upon passage of seed through a bird feeder.

Yet another object of the present invention is to provide a means for disabling the flow of seed entirely from certain sections of the feeder.

SUMMARY OF THE INVENTION

Briefly, the elastomeric hinge of the present invention is for use in joining those sections of a bird feeder where it is desirable to maintain a water repellent seam while simultaneously providing a flexible hinge. The present invention includes a block secured to the base of the feeder with an incremental step function as part of its configuration. This is used to control the seed flow by varying the restriction imposed on the flowage of seed in this gravity feed system.

In accordance with one embodiment of the present invention, there is provided a bird feeder having a base plate and two panels attached to the base plate, forming opposite walls of the bird feeder. A roof is supported by the panels. The roof has a first section affixed to the panels, a second section movable with respect to the first section, and an elastomeric hinge connecting the first and second sections of the roof, so that the second section can be displaced to allow access to the interior of the bird feeder for adding seed and cleaning.

In accordance with another embodiment of present invention, there is provided a flow rate block which supports a movable wall of the bird feeder in one of at least two positions so that the rate of flow of bird seed from the interior of the bird feeder can be varied.

BRIEF DESCRIPTION OF THE DRAWINGS

The novel features which are characteristic of the present invention are set forth with particularity in the claims, but the invention will be understood more clearly and fully from the following detailed description of a preferred embodiment thereof, as set forth in connection with accompanying drawings in which:

DETAILED DESCRIPTION OF THE PREFERRED EMBODIMENT

Figure 1:
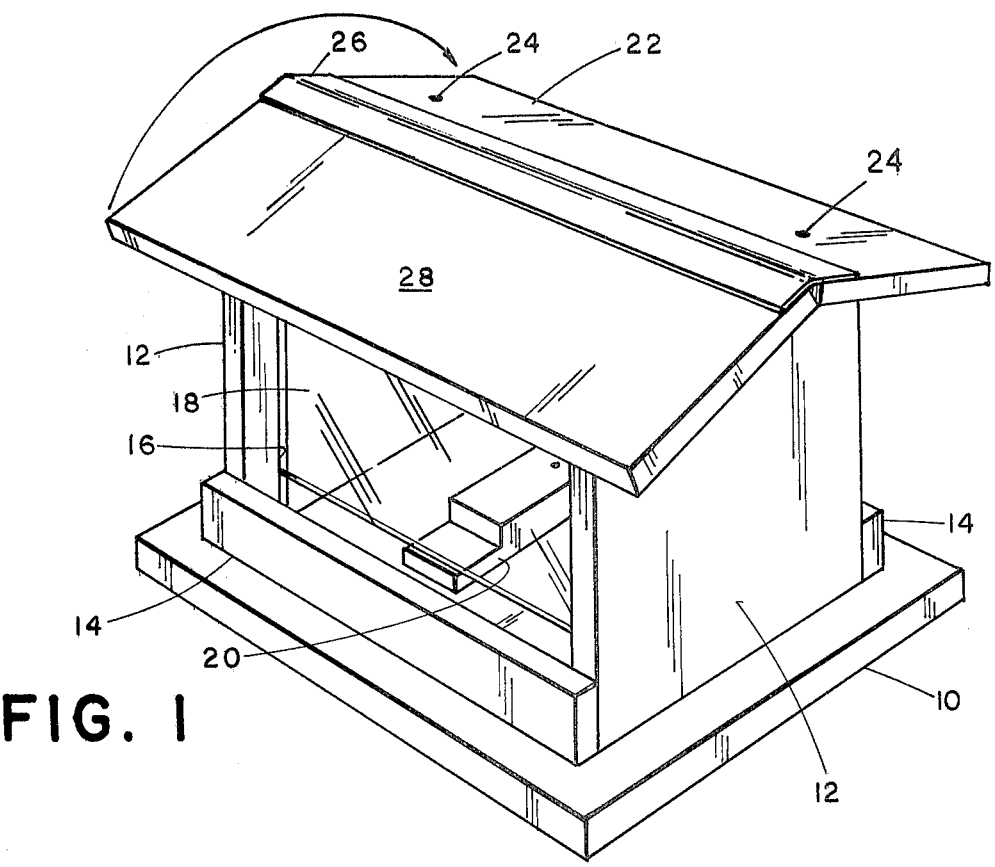
FIG. 1 is a perspective view of a bird feeder in accordance with present invention.

Referring now to the drawing wherein a preferred embodiment of the invention is illustrated, FIG. 1 discloses a bird feeder apparatus. Such a bird feeder can be mounted by conventional means to a post or to a side of a house or in the branches of a tree, or may be suspended in air if desired. The bird feeder has a base plate 10 upon which two side panels 12 are mounted by suitable means, such as glue, cement, or screws. Attached to the base plate 10 and to the two side panels 12 are seed retaining strips 14, one on each side of the bird feeder. A dado groove 16 is cut into the side of each of the side panels 12 to form channels. A glass or plexiglass panel 18 on each side of the bird feeder is positioned to slide in the dado grooves 16 and to come to rest on a flow rate block 20.

A fixed roof section 22 is secured to the two side panels 12 with two fasteners 24, such as screws. A flexible neoprene elastomeric hinge 26 is attached to the fixed roof section 22 by an adhesive or by staples. The hinge 26 may be made of any suitable flexible material such as, but not limited to, bendable plastic. The hinge 26 may be molded into the fixed roof section 22 rather than added thereto. The elastomeric hinge 26 is likewise attached to a movable roof section 28. The movable roof section 28 is not fastened directly to the side panels 12, and is thus free to move therefrom.

Figure 2:
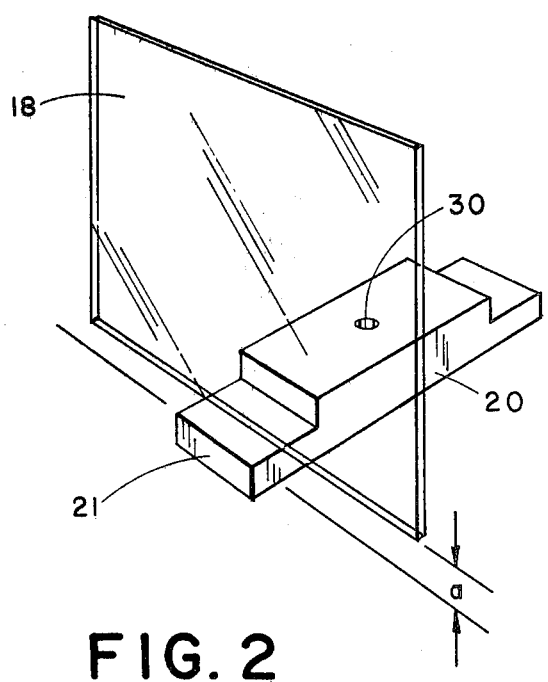
FIG. 2 is a perspective detail showing one orientation of the flow rate block.

Referring now to FIG. 2, details of the flow rate block 20 in one of its orientations are shown. The glass panel 18 rests upon a protrusion 21 of the flow rate block 20. This orientation is referred to as the summer feed position of the flow rate block 20. A clearance hole 30 is drilled in the center of the flow rate block 20. A screw (not shown) passes through the clearance hole 30 of the flow rate block 20 and secures the block 20 in its proper orientation to the base plate 10.

In operation, bird seed (not shown) is poured into the bird feeder in a manner hereinbelow described. When the flow rate block 20 is mounted as shown in FIG. 2, the plexiglass panels or walls 18 are elevated only slightly above the base plate 10, by the thickness "a" of the flow rate block protrusion 21 in such a fashion as to provide significant resistance to the flow of seeds that pass between the plexiglass walls 18 and the base plate 10. Ultimately the seed is held captive in seed dispensing channels formed by the seed retaining strips 14. Therefore, when the flow rate block 20 is mounted as shown in FIG. 2, obtaining seed from the seed dispensing channel becomes relatively difficult, which tends to encourage birds to search for supplementary sources of food as well. The restriction imposed upon the flow of seed is also useful in controlling the flow rate of certain smaller seed constituents.

Figure 3:
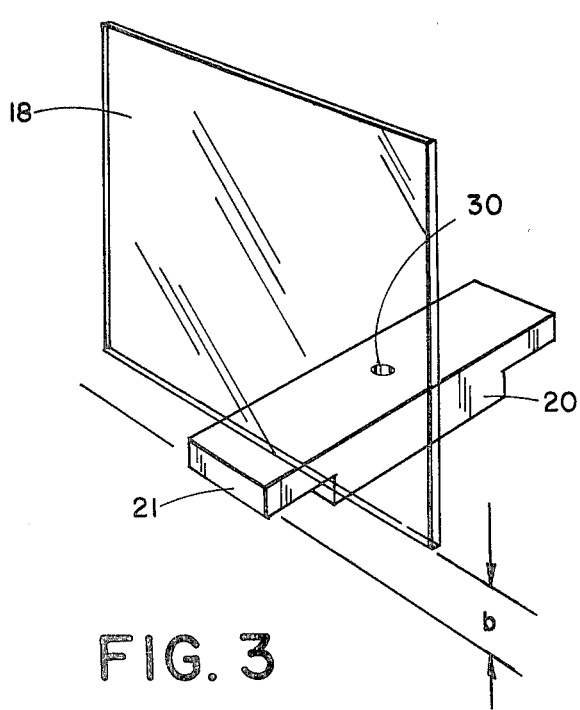
FIG. 3 is a perspective detail of a different orientation of the flow rate block.

FIG. 3 shows another orientation of the flow rate block 20. This orientation is referred to as the winter feed position of the flow rate block 20. When the flow rate block 20 is installed upside down as shown in FIG. 3, the uppermost plane of its protrusions 21 are elevated from the base plate 10 to a greater extent. This causes the plexiglass walls 18, disposed in the channels 16 to be held at a higher elevation "b" from the base plate 10 permitting bird seed to pass more freely under the plexiglass walls 18 and into the seed dispensing channels until the flow of seed is stopped by the seed retaining strips 14.

In essence the orientation of the flow rate block 20 regulates the flow rate of the seeds. Furthermore, the flow rate block 20 is designed so as to permit either of the protrusions 21 to be cut or broken off. When the protrusion 21 of the flow rate block 20 has been eliminated, there is no surface to cause an elevation of the plexiglass wall 18 above the base plate 10 of the feeder. Thus, the plexiglass wall 18 can contact the base plate 10 and seal off the flow of seeds entirely from that side.

In this fashion it is possible to control which side of the feeder functions as an active seed dispensing site.

The elastomeric strip 26 creates a hinge which allows the movable roof section 28 to be raised and rotated over and around the neoprene hinge or seam 26 until the movable roof section 28 ultimately rests on the fixed roof section 22. This provides a convenient method of accessing the center area of the feeder which functions as a reservoir to contain the remaining bird seed. By folding the movable section 28 over, bird seed may be easily poured into the feeder or the interior may be cleaned. The elastomeric strip 26 also functions as a waterproof seam between the fixed roof section 22 and the movable roof section 28 to assist in keeping the contents of the bird seed reservoir dry.

While the invention is hereinabove described with particularity, it should be understood that the scope of this invention is not limited to the embodiments herein described. In other designs, for example, a plurality of movable roof sections may be used, parallel to or perpendicular to each other, each with its own elastomeric strip. Likewise, a plurality of flow rate blocks may also be used. The dimensions of the flow rate block may also be modified to allow for any number of step function protrusions or multi-step configurations up to and including an inclined plane. In such circumstances, the flow rate block must be adapted to move perpendicular to the plexiglass wall which it supports. Each flow rate block can, in addition, be modified to serve a plurality of dispensing sites or each block may be modified to serve only one dispensing site.

Since these and other changes will be obvious to those skilled in the art, the invention is not considered limited to the examples chosen for purposes of disclosure, and covers all changes and modifications which do not constitute a departure from the spirit and scope of this invention.

What is claimed is:
1. A bird feeder comprising:
   (a) a base plate having an upper surface;
   (b) two panels attached to the upper surface of said base plate and disposed substantially perpendicularly thereto in spaced apart relationship, said panels forming opposite walls of the bird feeder; and
   (c) a roof for partially enclosing an area between said panels and supported thereby comprising:
      (i) a first roof section affixed to said panels,
      (ii) a second roof section in movable relationship with said first roof section, and
      (iii) an elastomeric member connecting said first roof section to said second roof section, said elastomeric member being affixed to the top of at least a portion of both of said roof sections and extending along substantially the entire length of the interface formed therebetween for providing a flexible water protective seal and hinge,
   whereby said second roof section can be displaced to facilitate access to the area enclosed by said base plate, said panels and said roof.
2. The bird feeder in accordance with claim 1 further comprising a substantially transparent sheet disposed between said panels, said sheet forming a wall of the bird feeder.

* * * * *